US008489565B2

(12) United States Patent
Balasubramanian et al.

(10) Patent No.: US 8,489,565 B2
(45) Date of Patent: Jul. 16, 2013

(54) DYNAMIC INTEGRATED DATABASE INDEX MANAGEMENT

(75) Inventors: Meiyalagan Balasubramanian, Hyderabad (IN); Rohit Sabharwal, Hyderabad (IN)

(73) Assignee: Microsoft Corporation, Redmond, WA (US)

( * ) Notice: Subject to any disclaimer, the term of this patent is extended or adjusted under 35 U.S.C. 154(b) by 610 days.

(21) Appl. No.: 12/409,631

(22) Filed: Mar. 24, 2009

(65) Prior Publication Data
US 2010/0250504 A1 Sep. 30, 2010

(51) Int. Cl.
G06F 17/30 (2006.01)

(52) U.S. Cl.
USPC .......................................................... 707/696

(58) Field of Classification Search
USPC .......................................................... 707/696
See application file for complete search history.

(56) References Cited

U.S. PATENT DOCUMENTS

| | | | |
|---|---|---|---|
| 7,289,999 B2 | 10/2007 | Ellis et al. | |
| 2002/0152304 A1* | 10/2002 | Collazo | 709/224 |
| 2005/0154710 A1 | 7/2005 | Ruhlow et al. | |
| 2007/0130107 A1* | 6/2007 | Waas et al. | 707/2 |
| 2008/0126311 A1 | 5/2008 | Rowley | |

OTHER PUBLICATIONS

Massie, Jason., "Take it a Step Further with the Unused and Missing Index DMV's", retrieved at <<http://statisticsio.com/Home/tabid/Home/tabid/36/articleType/ArticleView/articleId/21/Default.aspx, Feb. 1, 2009, pp. 10.

"14 Manageability", retrieved at <<http://cs.scu.edu.cn/~zuojie/oracle/server.101/b10743/mgmt_db.htm>>, Feb. 2, 2009, pp. 28.

Stirk, Ian., "Uncover Hidden Data to Optimize Application Performance", retrieved at <<http://msdn.microsoft.com/en-us/magazine/cc135978.aspx>>, Feb. 2, 2009, pp. 14.

Graefe, et al., "Microsoft SQL Server 7.0 Query Processor", retrieved at <<http://technet.microsoft.com/en-usilibrary/aa226170(SQL.70).aspx>>, Sep. 1998, pp. 17.

Atwood, "Coding Horror: Why Can't Database Tables Index Themselves?", retrieved at http://www.codinghorror.com/blog/archives/000638.html, Jul. 18, 2006, pp. 12.

Jianjun and Conor, "Tips, Tricks, and Advice from the SQL Server Query Optimization Team", retrieved at blogs. msdn.com/gueryopt-team/archive/2006/06/01/613516.aspx, Jun. 1, 2006, pp. 3.

* cited by examiner

Primary Examiner — James K. Trujillo
Assistant Examiner — Amresh Singh
(74) Attorney, Agent, or Firm — Ogilvie Law Firm

(57) ABSTRACT

Integral index management for a relational database is provided. Possible index management actions are identified to an administrator, and index management metric thresholds are provided by the administrator. An index metrics collection module automatically collects metric values. An index metrics analysis module automatically determines whether collected metric values satisfy specified thresholds. An index management action implementation module then implements index management actions, such as reorganizing or rebuilding indexes, adding indexes, and removing indexes. Threads may work in parallel on multiple tables of the relational database. Proposed actions may be subject to final authorization or may be implemented automatically after the metric threshold values are satisfied.

20 Claims, 3 Drawing Sheets

DYNAMIC INTEGRATED DATABASE INDEX MANAGEMENT

BACKGROUND

Databases are organized collections of data. Relational databases organize data records using structures such as tables (also known as relations), rows (a.k.a. tuples), and columns (a.k.a. attributes). SQL (Structured Query Language) and other tools are widely used for retrieving information from relational databases. Information retrieval can be made more efficient by using indexes to provide rapid access to database table contents. Queries based on a specific value of a column, for example, may be much faster if an index is available for that column. Indexes may be implemented in various ways, e.g., they may have a clustered architecture or a non-clustered architecture; they may be stored on the same medium as the database records and/or separately; they may be dense or sparse with respect to coverage of records in the database; and they may use data structures such as balanced trees, B+ trees, hashes, and bitfields.

SUMMARY

Relational database index management can provide benefits by controlling index fragmentation and adding/removing indexes based on database queries. Unfortunately, relational database index management can involve time-consuming manual analysis, and specialized development efforts. Index management can also impose organizational overhead, and database usage costs.

However, some embodiments described herein provide integral index management for a relational database. For example, in some embodiments possible index management actions are identified to an administrator, and index management metric thresholds are provided by (or ratified by) the administrator. An index metrics collection module automatically collects metric values while the database continues to be available for answers to routine queries by non-administrative users. The metrics may include values such as average total user cost of executing a query, average user impact of executing a query, amount of time a lock was held, amount of CPU used, amount of memory used, number of reads per disk sector, size of disk queue length, number of query timeouts, index fragmentation, and the number of days since an index was last used. An index metrics analysis module automatically determines whether collected metric values satisfy thresholds previously specified by the database administrator. An index management action implementation module then implements index management actions, such as reorganizing or rebuilding indexes, adding indexes, and removing indexes. An embodiment may implement index management action with threads working in parallel on multiple tables of the relational database, with at most one thread working on any given table at any given time. In some cases, proposed actions are subject to final authorization by the database administrator before being implemented in the database, whereas in other cases actions are implemented automatically after the metric threshold values are satisfied. Because index management is integral, the relational database remains available to non-administrative users during the value collection, the analysis, and the action implementation.

The examples given are merely illustrative. This Summary is not intended to identify key features or essential features of the claimed subject matter, nor is it intended to be used to limit the scope of the claimed subject matter. Rather, this Summary is provided to introduce—in a simplified form—some concepts that are further described below in the Detailed Description. The innovation is defined with claims, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

DETAILED DESCRIPTION

Overview

Figure 1:
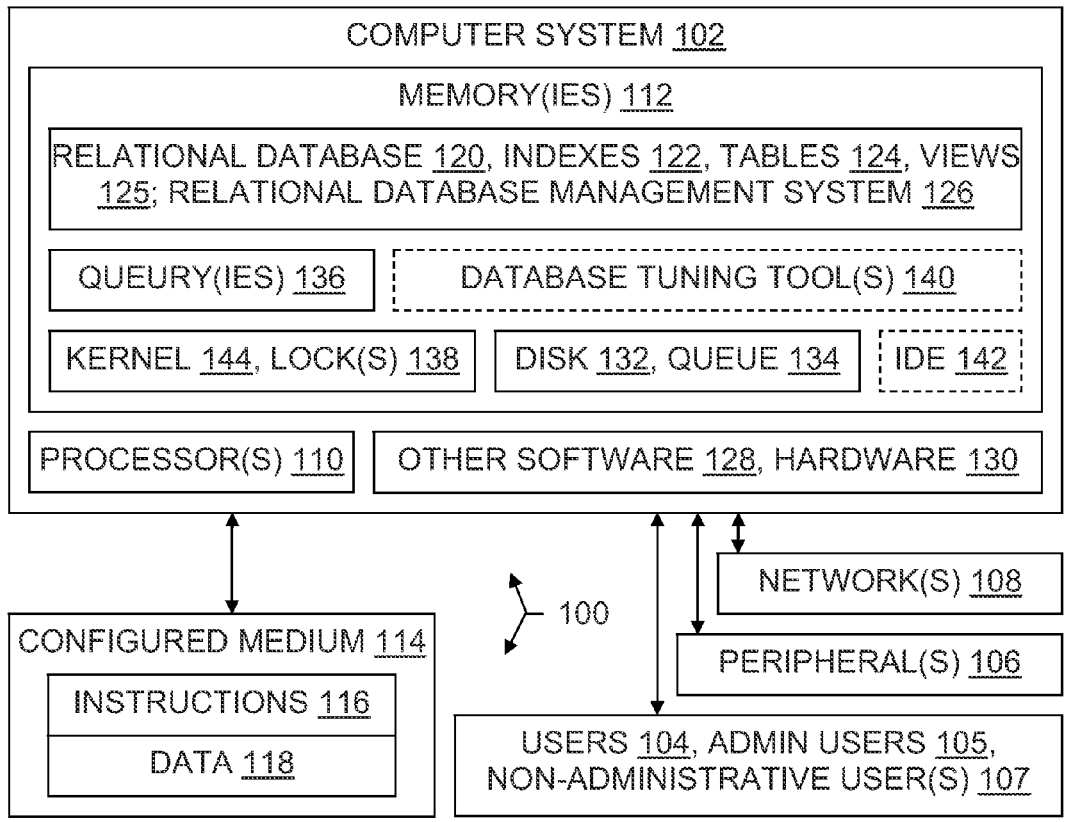
FIG. 1 is a block diagram illustrating a computer system having at least one processor, at least one memory, at least one relational database, and other items in an operating environment which may be present on multiple network nodes, and also illustrating configured storage medium embodiments.

It may be beneficial in a relational database management system to regularly monitor index fragmentations and control them appropriately, to remove unused indexes, and to create required indexes based on changing user query patterns. In some situations, such index management may be performed without an integral index management component, leading to problems such as the following. First, running query profilers/traces to study changing query patterns may cause significant performance overhead on database servers. Second, manual and time consuming analysis of profiled/traced queries may be called for to arrive at efficient indexing recommendations. Third, resolving index related issues may impose organizational overhead and slow turnaround time due to database administration, engineering team, and IT release cycles. Also, organizational overhead may be significant because no single team owns the complete index management process. For example, a production support team may handle index fragmentation while an engineering team handles index creation and removal based on reporting needs, while custom components for dynamic index management are written and maintained by application engineering team.

Some embodiments described herein mitigate or remove the foregoing problems by providing integral index management (also referred to as integrated index management). Embodiments vary in the features and capabilities they provide, and in the problems they mitigate or avoid. However, the following overview contrasts some embodiments with the familiar Microsoft SQL Server® Database Tuning Advisor™ tool, to promote an understanding of embodiment aspects (marks of Microsoft Corporation). The SQL Server® Database Tuning Advisor tool is referred to hereafter as "DTA".

DTA does not provide integral index management. The discussion of DTA herein is thus guided by a knowledge of alternatives to DTA, namely, embodiments that do provide integral index management. One of skill who did not have the benefit of understanding integral index management embodiments would not necessarily have viewed DTA in the manner presented here.

DTA provides index recommendations for a given workload of queries. Likewise, Oracle's SQL Tuning Advisor tool provides index recommendations for a given workload of queries. Other relational database products also have a separate component that would read a given set of queries and provide the indexing recommendations based on storage, partitioning, and other considerations. Many such products have significant limitations. For instance, the tools are manually controlled. A set of user queries to be analyzed must be captured from production database servers using profilers/ traces or other mechanisms that can add significant performance overhead to a production relational database management system. Implementing the index recommendations on the production databases may require IT release cycles, which is often time consuming. Also, many tools do not manage index fragmentations, and some do not identify unwanted indexes on the databases over a period of time.

More specifically, DTA does help administrators select and create an efficient set of indexes, indexed views, and partitions without an expert understanding of the structure of the database or the internals of the Microsoft SQL Server® solution. DTA analyzes a workload and the physical implementation of one or more databases. A workload is a set of Transact-SQL statements that execute against a database or databases to be tuned. A workload is prepared in a SQL Server® Management Studio solution, or captured using a SQL Server® profiler. A profiler ships with the SQL Server® product, and can be used to capture all the queries that are run by a SQL Server® instance for a given time period. However, the profiler can degrade performance of user queries that are run at the same time as the profiler. DTA targets missing indexes and partitions to improve the query performance on a workload's SQL statements. DTA is run manually offline against the relational database server to get recommendations. Implementing the index changes in production, after identifying them with DTA, can be a tedious and time consuming experience. DTA allows one to create new indexes from within DTA, but the index creation scripts run in serial fashion.

By contrast, some embodiments provide integral index management. In some embodiments, index management is integral with the RDBMS (a type of relational database management system), in the sense that one or more modules within the RDBMS automatically capture information on which index management actions can be based. In some embodiments, index management is integral with database administration, in the sense that other organizational components, such as IT or engineering, are substantially or entirely relieved of responsibility as compared with their involvement when DTA is used for index management as described above. In some embodiments, index management is integral in the sense that all major aspects of index management (fragmentation, missing indexes, unused indexes) are addressed by the same people using the same tool, rather than being omitted or being addressed in a more ad hoc manner. In some embodiments, index management is integral in the sense that reasons to act are closely integrated with corresponding actions. Index change actions are automatically implemented once conditions specified by an administrator have been met, without the overhead of further user authorization; in some situations, however, actions are implemented only after final user authorization is given.

In particular, some embodiments described herein provide a Dynamic Index Management (DIM) component containing one or more modules. The DIM component may reside within an RDBMS product, in some embodiments. The DIM component helps manage the database indexes dynamically, that is, helps control index fragmentation, remove unused indexes, and create missing indexes without removing the database from routine non-administrative use. Index management actions are proposed, based on a database administrator's application-specific index management configuration thresholds. Reduced or minimal engineering involvement is called for, thus improving the overall query performance of the system and reducing the analysis, development and testing efforts during index management.

For example, one embodiment includes a Dynamic Index Management (DIM) component within the RDBMS product itself, as opposed to using DTA or custom index management applications built by database developers. The embodiment focuses on three primary indexing factors that could affect performance, namely, controlling index fragmentation, removing unused indexes, and creating required indexes based on new query patterns. The embodiment operates in accordance with configurable thresholds, in that index related data are analyzed by DIM based on the configuration given by the database administrator; the threshold numbers for each parameter may be different for each specified database application. Configuration is done using a user interface. Thus, one might configure DIM to create a rebuild action for an index which is 35% fragmented. In some embodiments, index changes are governed by the database administrator. The database administrator can do any of the following in the user interface to control actions proposed by DIM before the actions are implemented: Enable/Disable any suggestion, e.g., disable a particular index drop suggestion; Modify any suggestion, e.g., modify key columns for a new index based on a new requirement. In this embodiment, DIM is executed based on configured schedules. Also, in this embodiment the index suggestions are implemented in parallel based on a number of threads which is configured by the database administrator. The index changes may be implemented with the database online (available to non-administrative users) or offline.

In some embodiments, DIM operates in the following loop, to make the index management process dynamic with less manual effort. First, collect index usage data from a query processor and collect fragmentation data. Collected data are placed in an internal repository, and used later to help analyze and manage the indexes dynamically. Second, obtain through a user interface from the database administrator the index thresholds for various actions that may be taken on the indexes. The user interface enables the database administrator to configure values used to transform index related data into implementable index actions. Third, analyze the index related data values against the configuration's thresholds, and publish the recommended actions back to the database administrator. Fourth, through the user interface allow the database administrator to update and approve the index changes. Fifth, implement all the approved index changes in the database(s). Some benefits of DIM, and of integral index management generally, may be: reduced or eliminated performance overhead on database servers to study the query pattern for indexing, a choice between completely automatic index management and a manual mode with very minimal manual verification of proposed index changes, a faster turnaround time due to less engineering team involvement in studying the indexes, and a single solution to handle complete index management.

Reference will now be made to exemplary embodiments such as those illustrated in the drawings, and specific language will be used herein to describe the same. But alterations and further modifications of the features illustrated herein, and additional applications of the principles illustrated herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage, in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventors assert and exercise their right to their own lexicography. Terms may be defined, either explicitly or implicitly, here in the Detailed Description and/or elsewhere in the application file.

As used herein, a "computer system" may include, for example, one or more servers, motherboards, processing nodes, personal computers (portable or not), personal digital assistants, cell or mobile phones, and/or device(s) providing one or more processors controlled at least in part by instructions. The instructions may be in the form of software in memory and/or specialized circuitry. In particular, although it may occur that many embodiments run on workstation or laptop computers, other embodiments may run on other computing devices, and any one or more such devices may be part of a given embodiment.

A "multithreaded" computer system is a computer system which supports multiple execution threads. The term "thread" should be understood to include any code capable of or subject to synchronization, and may also be known by another name, such as "task," "process," or "coroutine," for example. The threads may run in parallel, in sequence, or in a combination of parallel execution (e.g., multiprocessing) and sequential execution (e.g., time-sliced). Multithreaded environments have been designed in various configurations. Execution threads may run in parallel, or threads may be organized for parallel execution but actually take turns executing in sequence. Multithreading may be implemented, for example, by running different threads on different cores in a multiprocessing environment, by time-slicing different threads on a single processor core, or by some combination of time-sliced and multi-processor threading. Thread context switches may be initiated, for example, by a kernel's thread scheduler, by user-space signals, or by a combination of user-space and kernel operations. Threads may take turns operating on shared data, or each thread may operate on its own data, for example.

A "logical processor" or "processor" is a single independent hardware thread-processing unit. For example a hyperthreaded quad core chip running two threads per core has eight logical processors. Processors may be general purpose, or they may be tailored for specific uses such as graphics processing, signal processing, floating-point arithmetic processing, encryption, I/O processing, and so on.

A "multiprocessor" computer system is a computer system which has multiple logical processors. Multiprocessor environments occur in various configurations. In a given configuration, all of the processors may be functionally equal, whereas in another configuration some processors may differ from other processors by virtue of having different hardware capabilities, different software assignments, or both. Depending on the configuration, processors may be tightly coupled to each other on a single bus, or they may be loosely coupled. In some configurations the processors share a central memory, in some they each have their own local memory, and in some configurations both shared and local memories are present.

"Kernels" include operating systems, hypervisors, virtual machines, and similar hardware interface software.

"Code" means processor instructions, data (which includes constants, variables, and data structures), or both instructions and data.

"Relational database" means a database which comprises relations (tables), regardless of whether a portion of the database is also organized by some mechanism other than relations.

"User interface" means a graphical user interface, command line interface, remote login or other remote mechanism, Application Program Interface, and/or any other mechanism by which a user can submit commands (at least) to system or program.

Throughout this document, use of the optional plural "(s)" means that one or more of the indicated feature is present. For example, "index(es)" means "one or more indexes" or equivalently "at least one index"; "value(s)" means "one or more values" or equivalently "at least one value".

Whenever reference is made to data or instructions, it is understood that these items configure a computer-readable memory thereby transforming it to a particular article, as opposed to simply existing on paper, in a person's mind, or as a transitory signal on a wire, for example.

Operating Environments

With reference to FIG. 1, an operating environment 100 for an embodiment may include a computer system 102. The computer system 102 may be a multiprocessor computer system, or not. An operating environment may include one or more machines in a given computer system, which may be clustered, client-server networked, and/or peer-to-peer networked.

Human users 104 may interact with the computer system 102 by using displays, keyboards, and other peripherals 106. System administrators, database administrators, developers, engineers, and end-users are each a particular type of user 104. Database administrators are also an example of admin users 105. Non-administrative users 107 are users 104 who do not have administrative rights, and in particular, do not have rights such as the right to turn on a profiler, or the right to authorize a change to a database index. Automated agents acting on behalf of one or more people may also be users 104, 105, 107.

Storage devices and/or networking devices may be considered peripheral equipment in some embodiments. Other computer systems not shown in FIG. 1 may interact with the computer system 102 or with another system embodiment using one or more connections to a network 108 via network interface equipment, for example.

The computer system 102 includes at least one logical processor 110. The computer system 102, like other suitable systems, also includes one or more memories 112. The memories 112 may be volatile, non-volatile, fixed in place, removable, magnetic, optical, and/or of other types. In particular, a configured medium 114 such as a CD, DVD, memory stick, or other removable non-volatile memory medium may become functionally part of the computer system when inserted or otherwise installed, making its content accessible for use by processor 110. The removable configured medium 114 is an example of a memory 112. Other examples of memory 112 include built-in RAM, ROM, hard disks, and other storage devices which are not readily removable by users 104.

The medium 114 is configured with instructions 116 that are executable by a processor 110; "executable" is used in a broad sense herein to include machine code, interpretable code, and code that runs on a virtual machine, for example. The medium 114 is also configured with data 118 which is created, modified, referenced, and/or otherwise used by execution of the instructions 116. The instructions 116 and the data 118 configure the memory 112/medium 114 in which they reside; when that memory is a functional part of a given computer system, the instructions 116 and data 118 also configure that computer system. In some embodiments, a portion of the data 118 is representative of real-world items such as product characteristics, inventories, physical measurements, settings, images, readings, targets, volumes, and so forth. Such data is also transformed by as discussed herein, e.g., by indexing, profiling, rebuilding, defragmenting, reorganizing, analyzing, and/or other operations.

Memories 112 may be of different physical types. A relational database 120 containing (at least from a high-level perspective) indexes 122 and tables 124, database views 125, a relational database management system 126, other software 128, and other items shown in the Figures may reside partially or entirely within one or more memories 112, thereby configuring those memories. The word "system" in "relational database management system" does not override the "system" in "computer system" but does conform with industry terminology—the relational database management system 126 is often part of a larger system 102. An operating environment may also include other hardware 130, such buses, power supplies, and accelerators, for instance.

Disks 132 are a form of memory 112, but are specifically called out for later convenient reference. Disk queues 134 likewise reside in a memory 112, but are specifically referenced later. User queries 136 to the database 120 may take various forms, such as SQL statements, XML constructs, Boolean conditions, and so on. Locks 138 may be part of a kernel 144, or part of a relational database management system 126; locks reside in a memory 112, but are specifically referenced later. Some systems 102 include one or more familiar database tuning tools 140, such as the Microsoft SQL Server® Database Tuning Advisor tool, or the Oracle® SQL Tuning Advisor tool.

A given operating environment 100 may include an Integrated Development Environment (IDE) 142 which provides a developer with a set of coordinated software development tools. In particular, some of the suitable operating environments for some embodiments include or help create a Microsoft® Visual Studio® development environment (marks of Microsoft Corporation) configured to support program development. Some suitable operating environments include Java® environments (mark of Sun Microsystems, Inc.), and some include environments which utilize languages such as C++ or C# ("C-Sharp"), but teachings herein are applicable with a wide variety of programming languages, programming models, and programs, as well as with endeavors outside the field of software development per se that use database tuning tools, database index management processes, or both.

Some items are shown in outline form in FIG. 1 to emphasize that they are not necessarily part of the illustrated operating environment, but may interoperate with items in the operating environment as discussed herein. It does not follow that items not in outline form are necessarily required, in any Figure or any embodiment.

Systems

Figure 2:
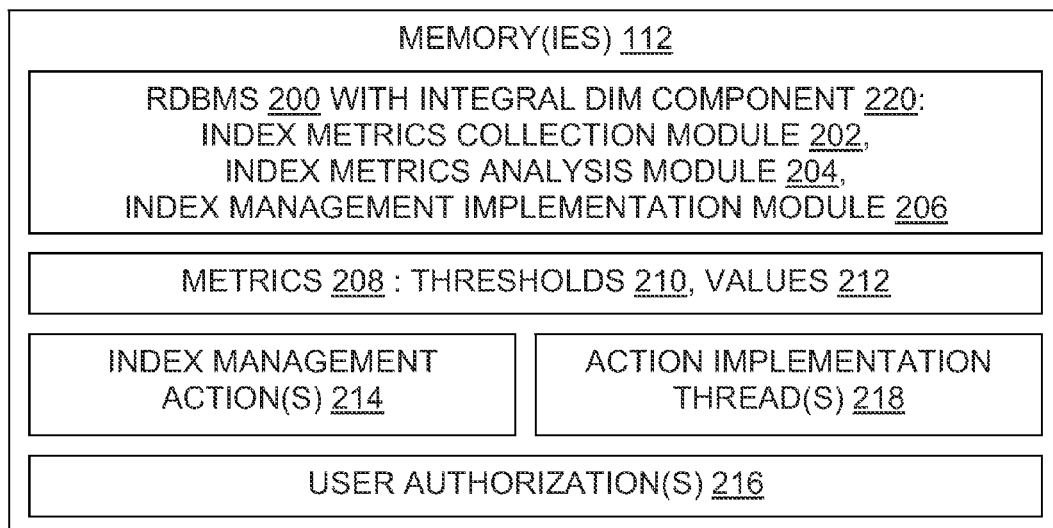
FIG. 2 is a block diagram illustrating a relational database management system with integral index management, in an example architecture.

FIG. 2 illustrates an architecture which is suitable for use with some embodiments. An RDBMS 200 (an upgraded/modified relational database management system embodiment) includes three integral DIM component 220 modules; the functionality of these modules may differ and/or may be allocated differently in alternate embodiments. An index metrics collection module 202 collects values 212 for specified metrics 208 during use of the relational database 120. An index metrics analysis module 204 compares collected metric values 212 to threshold(s) 210 specified by a database administrator, and may also consider the context, e.g., different thresholds may apply for different database usage contexts, such as different applications, different user(s), and/or different tables. The analysis module 204 proposes index management action(s) 214, such as rebuilding an index, creating an index, removing an index, or reorganizing an index. An index management implementation module 206 implements authorized action(s) to change database index(es) 122. User authorization 216 of action(s) 214 may be implicit (for automatically implemented actions) or explicit (for actions which require confirmation by the database administrator after being proposed by the analysis module 204). Actions 214 may be implemented serially, but in some embodiments multiple action implementation threads 218 are used to implement actions in parallel.

In some embodiments peripherals 106 such as human user I/O devices (screen, keyboard, mouse, tablet, microphone, speaker, motion sensor, etc.) will be present in operable communication with one or more processors 110 and memory 112. However, an embodiment may also be deeply embedded in a system, such that no human user 104 interacts directly with the embodiment. Software processes may be users 104.

In some embodiments, the system includes multiple computers connected by a network. Networking interface equipment can provide access to networks 108, using components such as a packet-switched network interface card, a wireless transceiver, or a telephone network interface, for example, will be present in a computer system. However, an embodiment may also communicate through direct memory access, removable nonvolatile media, or other information storage-retrieval and/or transmission approaches, or an embodiment in a computer system may operate without communicating with other computer systems.

In some embodiments, the DIM component 220 resides within the RDBMS 200 product, and helps admin users 105 select and create efficient indexes and remove unused indexes, based on the queries run against a database server system 102 over a period of time. The DIM component 220 also helps admin users 105 control index fragmentation in the database 120. Unlike database tuning tools 140 that only address missing indexes and partitions to improve query performance, a DIM component 220 may cover more aspects of index management, e.g., also removing unused indexes, and controlling index fragmentations by regular defragmenting. Unlike database tuning processes for which workload SQL statements have to be prepared either manually or captured using a profiler to feed a tuning tool 140, a DIM component within the RDBMS server automatically captures metric values that help identify missing indexes and provide other data for index management decision making.

In some embodiments, metrics 208 automatically captured by a DIM component 220 and used for index management include: the impact of not having a particular index (already captured in a Microsoft SQL Server® installation), the cost to execute the query without a particular index (also available from a Microsoft SQL Server® installation), the number of times a particular index could have helped in user scans (also available from a Microsoft SQL Server® installation), the number of times a particular index could have helped in user seeks (also available from a Microsoft SQL Server® installation), the amount of time a lock 138 was held on objects when a particular index was missing (assumed to be available, e.g., from the kernel or RDBMS), the amount of CPU (a.k.a. processor 110) used when a particular index was missing (assumed available, e.g., from the kernel), the amount of memory used when a particular index was missing (assumed available, e.g., from the kernel), the amount of reads/sector on a disk 132 when a particular index was missing (assumed available, e.g., from the kernel), the size of a disk queue 134 length when a particular index was missing (assumed available, e.g., from the kernel), and the number of times the query timed out when a particular index was missing (assumed to be available, e.g., from the kernel or RDBMS).

In some database tuning processes a tuning tool 140 is run manually and offline against the relational database server to get recommendations, and implementing the index changes into production is time consuming and error prone. By contrast, in some embodiments the DIM component within an RDBMS supports online automatic index changes, which take effect quickly and provide a better Return On Investment. Some embodiments are not limited to serial creation of indexes. Indeed, some embodiments perform index management activities (create, remove, defragment indexes) on different tables 124 and/or views 125 in parallel to reduce the implementation time. While multiple threads 218 are used to achieve the parallelism, an activity allocation approach of some embodiments ensures that no more than one thread is working on a single table or view at a given time, thereby protecting database performance.

In some embodiments, a database administrator can configure the DIM component 220 with various parameters. To create missing indexes, threshold 210 values for the metrics 208 can be configured by an admin user 105. Missing indexes are automatically created when the value(s) 212 of the metric(s) meets the configured threshold(s). To remove unused indexes, a threshold 210 number of days an index can remain unused can be configured. When the threshold number of days (or hours, weeks, months, transactions, queries, etc.) is met, the unused index is removed automatically, or upon a database administrator's final authorization. To defragment indexes, thresholds 210 may specify different size ranges of indexes, e.g., min and max range of index fragmentation in percent, and the corresponding action to be taken to defragment the indexes, e.g., whether to reorganize or rebuild an index. An index fragmentation (sometimes called average index fragmentation, index fragmentation percentage, or other names in different systems) can be compared to configured index fragmentation threshold(s) as a basis for a decision whether to rebuild or reorganize an index.

Some embodiments provide a computer system 102 which includes at least one logical processor 110, and a memory 112 in operable communication with the logical processor. A relational database 120 configures the memory. A relational database management system designated here by 200 also configures the memory. Unlike familiar systems, the present RDBMS 200 includes an index metrics collection module 202 which is configured to automatically collect relational database index management metric values 212, based at least in part on queries 136 to the relational database 120 by non-administrative users 107. The RDBMS 200 also includes an index metrics analysis module 204 that is configured to automatically determine whether collected relational database index management metric values 212 satisfy specified thresholds 210. The RDBMS 200 also includes an index management action implementation module 206 configured to implement index management actions 214 while the relational database 120 being changed remains available to non-administrative users 107.

In some embodiments, threads 218 implement multiple index management actions 214, with the threads working in parallel on multiple tables 124 of the relational database, and with at most one thread working on any given table at any given time. In other embodiments, actions are implemented serially. In some embodiments, actions 214 are implemented with multiple simultaneous threads per table, for tables which are not in use and/or which are infrequently used, for example. Indexes can also be created on database views 125.

The actions 214 are implemented in response to a determination by the index metrics analysis module 204 that metric values 212 satisfy specified thresholds. For example, in one embodiment, the index metrics collection module 202 is configured to automatically collect and configure the memory with values for at least six of the following metrics 208 (not all of the possible metrics need be present in a given embodiment, so long as at least six of them are present): average total user cost of executing a query without a specified missing index, average user impact of executing a query without a specified missing index, number of times a specified missing index could have helped in scans, number of times a specified missing index could have helped in seeks, amount of time a lock was held on objects without a specified missing index, amount of CPU used without a specified missing index, amount of memory used without a specified missing index, number of reads per disk sector without a specified missing index, size of disk queue length without a specified missing index, number of query timeouts without a specified missing index, elapsed time since a specified index was last used, e.g., number of hours, days, or weeks since the index was last used.

It will be appreciated that the choice of six metrics, although not arbitrary, is nonetheless not the only choice available. Any number of metrics from one to the total number of defined possible metrics can be chosen for a particular embodiment. Thus, in some embodiments three metrics, four metrics, five metrics, seven metrics, and so on, are present. In particular, in one embodiment the index metrics collection module 202 is configured to automatically collect and configure the memory with at least all ten of the possible metrics listed above (other metrics may also be defined), based on queries to the relational database by only non-administrative users.

In some embodiments, the index management action implementation module 206 is configured to automatically implement multiple index management actions 214, while the relational database 120 remains available to non-administrative users; in other embodiments, the database is taken offline (automatically or manually) to implement certain actions 214.

In some embodiments, the index management action implementation module 206 is configured to automatically implement multiple index management actions 214 without requiring further user authorization 216 beyond the implicit authorization given when the user 105 provides the thresholds 210 to the system. In other embodiments, the index management action implementation module is configured to seek explicit user authorization 216 to implement an index management action 214 after a determination by the index metrics analysis module that metric values satisfy specified thresholds associated with that action by a user 105.

Methods

Figure 3:
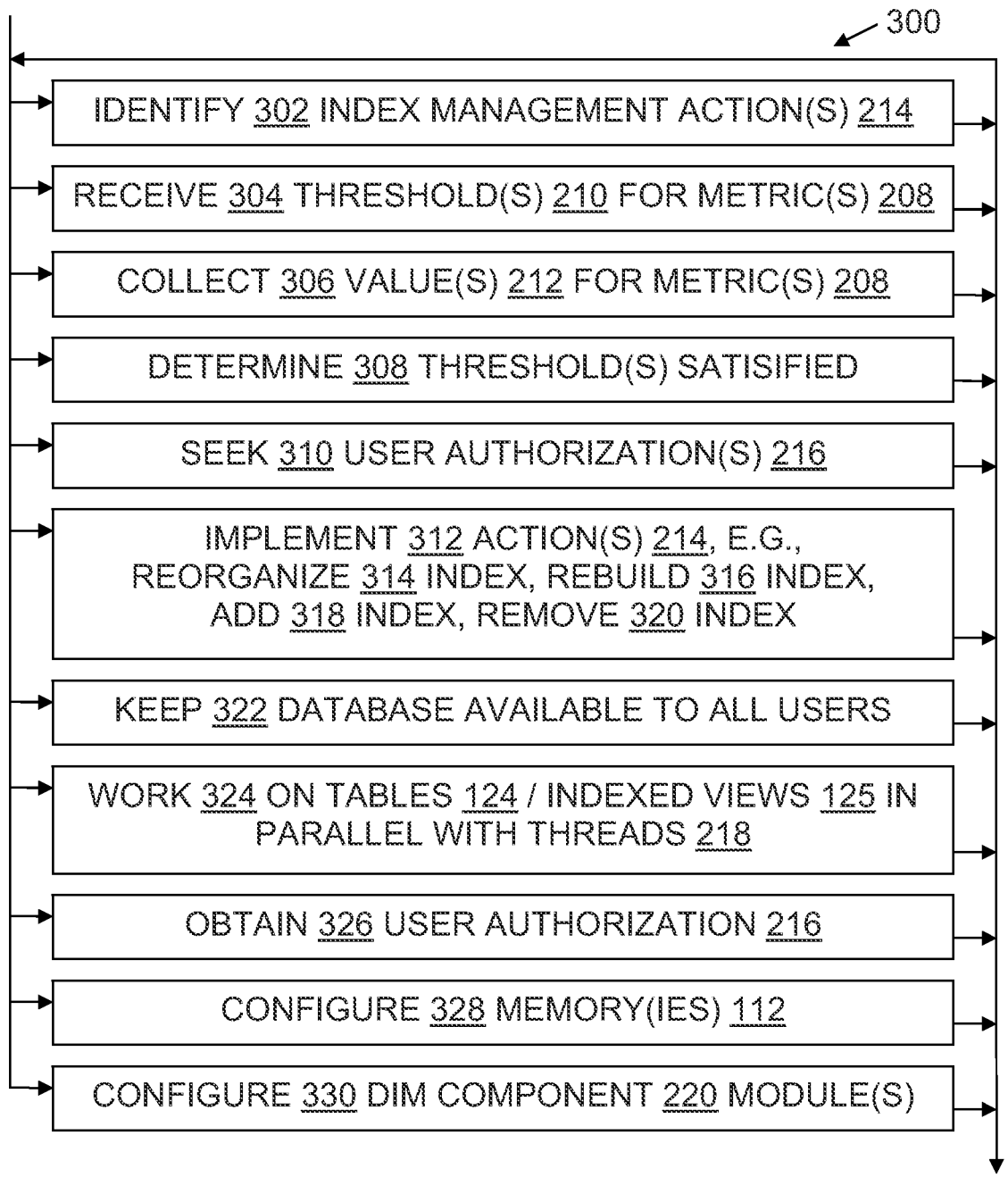
FIG. 3 is a flow chart illustrating steps of some method and configured storage medium embodiments.

FIG. 3 illustrates some method embodiments in a flowchart 300. Methods shown in the Figures may be performed in some embodiments automatically, e.g., by one or more of the modules 202, 204, 206, or by another DIM component 220 to collect values 212, compare values 212 to thresholds 210, and/or implement actions 214, under control of a script requiring little or no user input. Methods may also be performed in part automatically and in part manually unless otherwise indicated. In a given embodiment zero or more illustrated steps of a method may be repeated, perhaps with different parameters or data to operate on. Steps in an embodiment may also be done in a different order than the top-to-bottom order that is laid out in FIG. 3. Steps may be performed serially, in a partially overlapping manner, or fully in parallel. The order in which flowchart 300 is traversed to indicate the steps performed during a method may vary from one performance of the method to another performance of the method. The flowchart traversal order may also vary from one method embodiment to another method embodiment. Steps may also be omitted, combined, renamed, regrouped, or otherwise depart from the illustrated flow, provided that the method performed is operable and conforms to at least one claim.

Examples are provided herein to help illustrate aspects of the technology, but the examples given within this document do not describe all possible embodiments. Embodiments are not limited to the specific implementations, arrangements, displays, features, approaches, or scenarios provided herein. A given embodiment may include additional or different features, mechanisms, and/or data structures, for instance, and may otherwise depart from the examples provided herein.

During an action identifying step 302, an embodiment identifies one or more possible index management actions 214 to a user 104; it is expected that this user will typically be an admin user 105. Step 302 may be accomplished using a graphical user interface, a configuration file, and/or other mechanisms, for example. In some embodiments the actions 214 are identified together with default/recently used corresponding thresholds 210.

During a threshold receiving step 304, an embodiment receives one or more thresholds 210 for metrics 208. Step 304 may be accomplished using a graphical user interface, a configuration file, and/or other mechanisms, for example, in which numeric values, menu selections, enumeration values, key words, and/or other threshold values are indicated. In some embodiments step 304 is accomplished when a user ratifies default/recently used corresponding thresholds 210 shown to that user by the embodiment.

During a value collecting step 306, an embodiment collects value(s) 212 for metrics 208. Step 306 may be accomplished for some metrics using familiar functionality of relational database management systems 126 and/or kernels 144, as discussed elsewhere herein or readily apparent to one of skill. For example, metrics 208 that measure use of system 102 resources such as disks 132, other memories 112, processors 110, and so on, can generally be obtained from kernels 144. Similarly, some metrics 208 that measure activities specific to relational database 120 access may be obtained from tools provided in relational database management systems 126. These and other metrics 208 may also be measured with custom code created for the DIM component 220.

During a proposed action determining step 308, an embodiment determines that one or more actions 214 should be proposed (at least) for implementation, because the collected 306 values 212 satisfy the threshold(s) 210 for those action(s) 214. The proposed actions 214 may be a subset of actions identified 302 to the user; in some embodiments, however, an action can be proposed to the user when seeking 310 authorization, even if the action was not previously identified 302 to the user. Step 308 may be accomplished by comparing values 212 with thresholds 210, and by displaying, selecting internally, and/or otherwise computationally indicating the action(s) 214 that are associated with satisfied threshold(s) 210.

During a user authorization seeking step 310, an embodiment seeks user authorization 216 before implementing proposed action(s) 214. Step 310 may be accomplished by computationally noting in memory 112 an implicit user authorization provided before the action was determined 308, or by obtaining an explicit user authorization via a user interface after the action was determined 308. Actions which are automatically implemented generally rely on implicit user authorization.

During an action implementing step 312, an embodiment implements index management action(s) 214. For example, during step 312 an embodiment may reorganize 314 a relational database index 122, rebuild 316 an index 122, add 318 an index 122, and/or remove 320 an index 122. Step 312 may be accomplished using familiar functionality of relational database management systems 126 under the direction of and control of a DIM component 220, such as an integrated DIM component 220 of an RDBMS 200.

During an availability keeping step 322, an embodiment keeps a relational database 120 available to non-administrative users 107 while also performing one or more of steps 302-320. Step 322 may be accomplished, e.g., by integrating the DIM component 220 in an RDBMS 200 to make metric data gathering and analysis more efficient, more automatic, and less demanding of system and organizational resources.

During an implementation working step 324, an embodiment works on multiple tables 124 (including work as needed on corresponding indexes 122) in parallel to implement action(s) 214. Step 324 may be accomplished using threads 218, subject to regular scheduling or subject to database-performance-sensitive scheduling. Regular scheduling allows a kernel 144 to assign index management action implementation threads 218 in the same manner as other threads, that is, in the same manner as threads which are performing functions other than index management. By contrast, database-performance-sensitive scheduling assigns threads 218 in a manner designed to reduce or eliminate adverse impact on the performance of the database 120 while keeping 322 the database available to non-administrative users 107 during implementation 312 of index management actions 214. In particular, in some embodiments, database-performance-sensitive scheduling assigns threads 218 such that any table (including associated indexes) is worked on by at most one thread at a time.

During an authorization obtaining step 326, an embodiment obtains a user authorization 216, e.g., through a user interface.

During a memory configuring step 328, a memory 112 is configured by a DIM component 220, an index metrics collection module 202, an index metrics analysis module 204, an index management implementation module 206, an explicit or implicit user authorization 216, and/or otherwise in connection with a integrated index management as discussed herein.

During a DIM configuring step 330, a DIM component 220, an index metrics collection module 202, an index metrics analysis module 204, and/or an index management implementation module 206 is/are configured by or on behalf of a user (typically an admin user 105) for integrated index management. For example, an index metrics collection module 202 may be configured 330 through a user interface or a configuration file to automatically collect 306 relational database index management metric values 212 based on queries to the relational database 120 by non-administrative users 107 during a specified time period, from a specified organization unit, and/or implicating a specified table 124. An index metrics analysis module 204 may be configured to automatically determine 308 whether collected relational database index management metric values satisfy specified thresholds, e.g., by ratifying a set of metric thresholds and associated possible actions 214. An index management action implementation module 206 may be configured to implement index management actions, e.g., by specifying the thread scheduling approach (regular or database-performance-sensitive), and by specifying whether the relational database 120 is to remain available to non-administrative users during implementation 312.

The foregoing steps and their interrelationships are discussed in greater detail below, in connection with various embodiments.

Some embodiments provide a method for dynamically managing database indexes. Some such methods include identifying 302 a relational database index management action 214 to a user, and then receiving 304 from the user at least one threshold 210 for at least one relational database index management metric 208. The threshold and the metric are associated—computationally and in the user's view—with the identified index management action. The methods automatically collect 306 at least one value for the metric within a relational database management system, such as an RDBMS 200 with an integral DIM component 220. The methods computationally determine 308 that the collected value(s) satisfies the corresponding metric threshold(s) 210.

At this point, two approaches are possible. Some methods automatically implement 312 the identified index management action without requiring further user authorization, that is, without seeking 310 an explicit user authorization after the threshold(s) in question are satisfied. Other methods do seek 310 an explicit user authorization after the threshold(s) in question are satisfied, and allow the user to authorize the action as it is proposed, to modify the proposed action, or to prohibit the proposed action. Actions authorized as proposed, and actions modified by the user, are then implemented 312.

Possible relational database index management actions 214 which may be proposed when thresholds are satisfied may include, for example, one or more of the following: reorganize 314 a fragmented index 122, rebuild 316 a fragmented index 122, add 318 a missing index 122, remove 320 an unused index 122.

In some methods, the receiving step 304 receives a user-defined threshold for each of at least some specified number of the following relational database index management metrics 208: average total user cost of executing a query 136, average user impact of executing a query 136, amount of time a lock 138 was held on objects, amount of CPU (processor(s) 110) used, amount of memory 112 used, number of reads per disk 132 sector, size of disk queue 134 length, number of query 136 timeouts, index 122 fragmentation, number of days or other specified period since an index 122 was last used.

In particular, in some methods the identified 302 index management action includes an action 214 to add 318 a missing index, and the receiving step 304 receives a user-defined threshold for each of some specified number of the following relational database index management metrics 208: average total user cost of executing a query without a specified missing index, average user impact of executing a query without a specified missing index, number of times a specified missing index could have helped in scans, number of times a specified missing index could have helped in seeks, amount of time a lock was held on objects without a specified missing index, amount of CPU used without a specified missing index, amount of memory used without a specified missing index, number of reads per disk sector without a specified missing index, size of disk queue length without a specified missing index, number of query timeouts without a specified missing index.

As another particular example, in some methods the identified index management action includes an action 214 to reorganize an index and/or an action 214 to rebuild an index, and the receiving step 304 receives a user-defined threshold 210 for at least one of the following relational database index management metrics 208: amount of CPU used, amount of memory used, number of reads per disk sector, size of disk queue length.

In some methods, the implementing step 312 automatically implements the identified 302 index management action while the relational database remains available for use by non-administrative users 107. In other methods, database use by non-administrative users 107 is suspended while an admin user 105 uses the database 120 to implement index management actions.

In some methods, the implementing step 312 automatically implements the identified index management action(s) 214 in parallel on multiple tables of the relational database, which is understood to also include implementing actions as needed on indexes into such tables. In some methods, the implementing step automatically implements the identified index management action with threads 218 working 324 in parallel on multiple tables of the relational database. In some of those methods, threads are scheduled such that no more than one thread 218 works 324 on any given table at any given time to implement the identified index management action.

Configured Media

Some embodiments include a configured computer-readable storage medium 114, which is an example of a memory 112. Memory 112 may include disks (magnetic, optical, or otherwise), RAM, EEPROMS or other ROMs, and/or other configurable memory. The storage medium which is configured may be in particular a removable storage medium 114 such as a CD, DVD, or flash memory. A general-purpose memory 112, which may be removable or not, and may be volatile or not, can be configured into an embodiment using items such as a DIM component 220, an index metrics collection module 202, an index metrics analysis module 204, and/or an index management implementation module 206, in the form of data 118 and instructions 116, read from a removable medium 114 and/or another source such as a network connection, to form a configured medium. The configured memory 112 is capable of causing a computer system to perform method steps for transforming data through integral index management as disclosed herein. FIGS. 1 through 4 thus help illustrate configured storage media embodiments and method embodiments, as well as system and method embodiments. In particular, any of the method steps illustrated in FIG. 3 and/or FIG. 4, or otherwise taught herein, may be used to help configure a storage medium to form a configured medium embodiment.

Additional Examples

Additional details and design considerations are provided below. As with the other examples herein, the features described may be used individually and/or in combination, or not at all, in a given embodiment.

Figure 4:
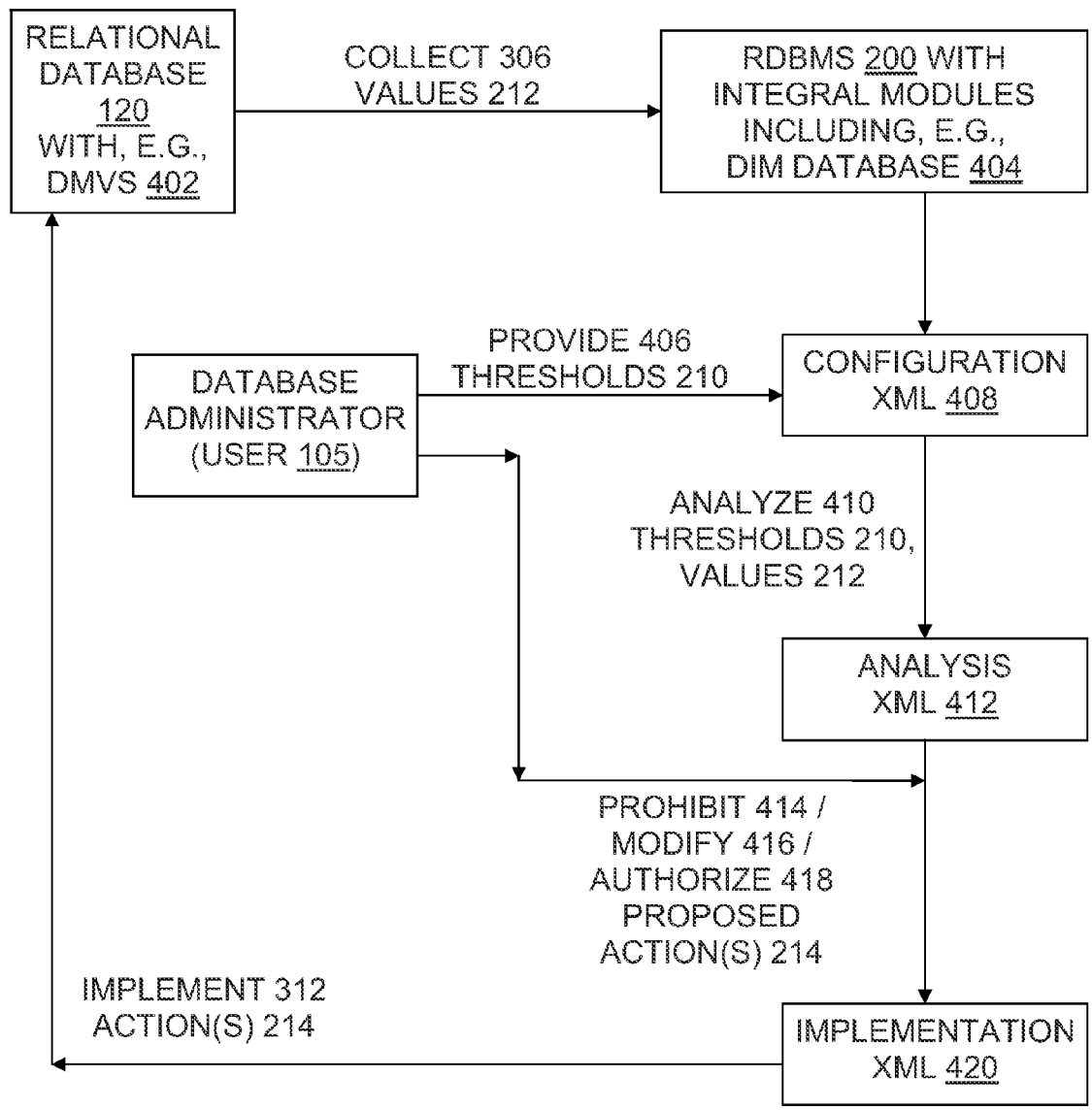
FIG. 4 is a data flow diagram illustrating integral index management in an example architecture.

Some embodiments include an architecture depicted in FIG. 4. A relational database 120 includes tools such as the Microsoft SQL Server® solution's Dynamic Management Views (DMVs) 402, such as index usage DMVs which provide information regarding index 122 use. An RDBMS 200 with integral modules of a DIM component 220 collects 306 values 212 related to specified metrics 208, and stores the values in a DIM database 404 for later analysis. A database administrator provides 406 thresholds 210, which are stored in a configuration XML 408 structure. The DIM component 220 analyzes collected values 212 to determine 308 whether any thresholds 210 are satisfied, and reports the result in an analysis XML 412 structure. In some situations (depending on the particular implementation and/or the particular threshold and/or the user-specified preferences), the analysis results are presented to the user to seek 310 authorization; the user may then prohibit 414, modify 416, and/or authorize 418 proposed action(s) 214, resulting in an implementation XML 420 that may differ substantively from the analysis XML. In other situations, actions are reported to the user but are implemented 312 without seeking 310 authorization.

In some embodiments, the Dynamic Index Management (DIM) Solution architecture includes four modules. A Collect Index Data module 202 loads index usage and missing indexes data values 212 into a repository such as a DIM database 404. An Index Data Analyser module 204 analyzes index 122 data from the DIM repository and publishes to a user the analysis results regarding index fragmentation, unused indexes, and missing indexes. A Verify Analysis Results (recommendations) quasi-module verifies the analysis XML 412 and approves changes needed to implement 312 the actions proposed in the analysis XML. A Manage Indexes module 206 consumes recommendations in an implementation XML 420 and implements 312 changes to the database indexes 122. The Verify Analysis Results "module" is actually the database administrator interacting with analysis module 204. For instance, a database administrator and an engineering team may verify the recommendations made by the Index Analyser module to make sure that the changes are as expected and there is no negative impact, and then approve the implementation XML file to be consumed for implementation.

Some embodiments provide usage based optimization on SQL databases from an indexing perspective to support an ongoing process rather than a onetime implementation. An ongoing process flow of Dynamic Index Management (DIM) includes a cycle containing Collect Index Data, Analyze Index Data, Verify Analysis Results, and Implement Index Changes steps.

We now consider a more detailed design. As with other examples herein, the details described may be used individually and/or in combination, or not at all, in a given embodiment.

As to the Collect Index Data module, this module of the DIM component 220 is responsible for collecting 306 the index related data from the RDBMS engine and storing them in a repository that can be used by other modules for analyzing and implementing the index changes. One approach uses a relational table in DIM database 404 as the repository storing the data, but an RDBMS product implementation may use relational tables or any other suitable data structure(s).

Functionalities of this module 202 include the following. First, read a metadata configuration to obtain the identity of the databases and objects to be analyzed for index usage and missing indexes, using, e.g., a DynamicIndexManagement-Metadata.xml file. Second, load the index usage statistics into the DIM repository (e.g., DIM database 404), using, e.g., a relational table IndexUsage and a subroutine CollectIndex-Data. Third, load missing index statistics into the DIM repository, using, e.g., relational table MissingIndex, relational table DynamicIndexManagementActivity, and subroutine CollectIndexData. Fourth, schedule the index data collection.

As to DynamicIndexManagementMetadata.xml file used in some embodiments, this XML is designed to get the metadata around operations identified below, with textual tables detailing a supporting implementation.

Identify index fragmentation and perform defragmentation (<IndexDefragmentation/>)

| Sno | Attribute | Purpose |
|---|---|---|
| 1 | DatabaseName | Database to analyse |
| 2 | SchemaName | Schema to analyse |
| 3 | ParentObjectName | Parent object to analyse |
| 4 | IndexName | Index to analyse |
| 5 | FragmentsAnalysisMode | Limited, Sampled or Detailed |
| 6 | ActionOnMixedFragments | Action to take when analysis mode is Detailed and fragment % in different levels result in different actions |

<Defrag/> Tags for Thresholds in Index Defragmentation

| Sno | Attribute | Purpose |
|---|---|---|
| 1 | MinFragmentation & MaxFragmentation | Min and Max Fragmentation for this range (Ranges 0 to 100). Fragment % is rounded to integer so ranges must be configured in integers |
| 2 | MinPageCount | Min and Max page counts for this range (Ranges 0 to −1 (infinite)) |
| 3 | Action | Action to be performed for this range (Reorganize or Rebuild) |
| 4 | AutomaticFix | Whether the action to be performed by DIM automatically or manual verification is required after analysis and before implementation (0 or 1) |

Identify and Remove Unused Indexes (<UnusedIndexes/>)

| Sno | Attribute | Purpose |
|---|---|---|
| 1 | DatabaseName | Database to analyse |
| 2 | SchemaName | Schema to analyse |
| 3 | ParentObjectName | Parent object to analyse |
| 4 | AutomaticFix | Whether the indexes are removed by DIM automatically or manual verification is required after analysis and before implementation (0 or 1) |
| 5 | AllowedNumberOf-Useddays | Minimum number of unused days allowed. Any index unused beyond this number will be reported and considered for removal |
| 6 | IndexDataRetentionDays | Index usage data are stored in DIM database for analysis purposes. This number decides the number of days of data to be retained in the database. If there are multiple entries of <UnusedIndexes/> tags with same database it's enough to mention the retention days against one entry. If there are multiple configuration for the same database, MAX of those is considered. Retention is treated only at database level though the index usage analysis is done up to parent object level |

Create Missing Indexes (<MissingIndexes/>)

| Sno | Attribute | Purpose |
|---|---|---|
| 1 | DatabaseName | Database to analyse |
| 2 | SchemaName | Schema to analyse |
| 3 | ParentObjectName | Parent object to analyse |
| 4 | AutomaticFix | Whether the indexes are created by DIM automatically or manual verification is required after analysis and before implementation (0 or 1) |
| 5 | NumberOfMissingIndexesToReport | Number of Top useful missing indexes to be considered for creation (Usefulness is calculated by avg_total_user_cost * avg_user_impact * (user_seeks + user_scan)) |

To further illustrate some embodiments, the following sample configuration metadata XML 408 is provided.

```
<DynamicIndexManagementMetadata>
<IndexDefragmentation DatabaseName="dbGCSCSAT" SchemaName="dbo"
    ParentObjectName="tblFactSurveyCompleted"
    FragmentsAnalysisMode="DETAILED"
    ActionOnMixedFragments="REBUILD">
  <Defrag MinFragmentation="6" MaxFragmentation="30" MinPageCount="1000"
    MaxPageCount="-1" Action="REORGANIZE" AutomaticFix="1" />
  <Defrag MinFragmentation="31" MaxFragmentation="100"
    MinPageCount="1000" MaxPageCount="-1" Action="REBUILD"
    AutomaticFix="1" />
  </IndexDefragmentation>
<IndexDefragmentation DatabaseName="dbGCSCSATStaging"
    SchemaName="dbo" ParentObjectName="tblCandidateIncidentbaseView"
    FragmentsAnalysisMode="DETAILED"
    ActionOnMixedFragments="REBUILD">
  <Defrag MinFragmentation="1" MaxFragmentation="100" MinPageCount="5"
    MaxPageCount="-1" Action="REBUILD" AutomaticFix="1" />
  </IndexDefragmentation>
  <UnusedIndexes DatabaseName="dbGCSCSAT" SchemaName="dbo"
    ParentObjectName="tblFactSurveyCompleted" AutomaticFix="0"
    AllowedNumberOfUnuseddays="-1" />
  <UnusedIndexes DatabaseName="dbGCSCSATStaging" SchemaName="dbo"
    ParentObjectName="tblCandidateIncidentBaseView" AutomaticFix="0"
    AllowedNumberOfUnuseddays="-210" IndexDataRetentionDays="1" />
  <MissingIndexes DatabaseName="dbGCSCSAT" SchemaName="dbo"
    ParentObjectName="tblFactSurveyCompleted"
    NumberOfMissingIndexesToReport="10" AutomaticFix="0" />
  <MissingIndexes DatabaseName="dbGCSCSATStaging" SchemaName="dbo"
    ParentObjectName="tblCandidateIncidentPropertiesView"
    NumberOfMissingIndexesToReport="10" AutomaticFix="0" />
</DynamicIndexManagementMetadata>
```

As to the relational table IndexUsage used in some embodiments, this table is used to accumulate the index usage metrics for analysis. Data accumulation is done using the subroutine CollectIndexData. Later this table is used in the subroutine AnalyseIndexes to analyze the stored data against the metadata to take appropriate actions.

Note that the columns in the table schema below (except Key column, object names, and insert/update time columns) also identify the metrics 208 whose values 212 are to be captured and loaded from the RDBMS engine. Some embodiments use the following schema for IndexUsage:

| Column Name | Datatype | Length | Nullable | Description |
|---|---|---|---|---|
| hash_key | int | 4 | no | Primary key, a hash generated on database name, schema name, parent object name, index name |
| database_name | sysname | 256 | no | |
| schema_name | sysname | 256 | no | |
| parent_objectname | sysname | 256 | no | |
| index_name | sysname | 256 | no | |
| type_desc | nvarchar | 120 | no | |
| user_seeks | bigint | 8 | no | number of seeks used the index |
| user_scans | bigint | 8 | no | number of scans used the index |
| user_lookups | bigint | 8 | no | number of lookups used the index |
| user_updates | bigint | 8 | no | number of updates used the index |
| last_usage | datetime | 8 | no | Date and time when the index was used last |
| rows | bigint | 8 | no | number of rows in the index |
| inserttime | datetime | 8 | no | Audit column |
| updatetime | datetime | 8 | no | Audit column |

As to the relational table MissingIndex used in some embodiments, this table is used to accumulate the missing indexes metrics 208. Data accumulation is done using the subroutine CollectIndexData. Later this table is used in subroutine AnalyseIndexes to analyze the stored data against the metadata to take appropriate actions.

Note that the columns in the table schema below (except Key column, object names, and insert/update time columns) also identify the metrics 208 whose values 212 are to be captured and loaded from the RDBMS engine. Some embodiments use the following schema for MissingIndex:

| Column Name | Datatype | Length | Nullable | Description |
| --- | --- | --- | --- | --- |
| hash_key | int | 4 | no | Primary key, a hash generated on database name, schema name & parent object name |
| database_name | sysname | 256 | no | |
| schema_name | sysname | 256 | no | |
| parent_object_name | sysname | 256 | no | |
| equality_columns | nvarchar | −1 | yes | Key columns proposed for index and used in equal conditions when the data was queried |
| inequality_columns | nvarchar | −1 | yes | Key columns proposed for index and used in inequal conditions when the data was queried |
| included_columns | nvarchar | −1 | yes | Columns to be included into the index to cover certain queries |
| avg_total_user_cost | float | 8 | yes | Total cost of executing the query without the index |
| avg_user_impact | float | 8 | yes | Average impact on the user query without the index |
| user_seeks | bigint | 8 | no | number of times the index could have helped in seeks |
| user_scans | bigint | 8 | no | number of times the index could have helped in scans |
| Lock_held | bigint | 8 | no | Amount of time the lock held on the objects when the required index was missing |
| cpu_usage | bigint | 8 | no | Amount of CPU used when the required index was missing |
| memory_usage | bigint | 8 | no | Amount of memory used when the required index was missing |
| reads_sec | bigint | 8 | no | Amount of reads/sec on a disk when the required index was missing |
| disk_queue_length | bigint | 8 | no | Size of disk queue length when the required index was missing |
| time_out | int | 4 | no | Number of times the query timed out when the required index was missing |
| inserttime | datetime | 8 | no | Audit column |
| updatetime | datetime | 8 | no | Audit column |

As to the subroutine CollectIndexData used in some embodiments, this subroutine refers the configuration XML 408 discussed above and collects the index 122 usage and missing indexes metrics 208 (last usage of index, impact of an missing index etc.) from the RDBMS engine and loads them into the IndexUsage relational table. How the RDBMS engine exposes these metrics will depend on the RDBMS vendor. For example, Microsoft's SQL Server® solution exposes these values via index usage DMVs 402 (Dynamic Management Views). Some embodiments utilize a subroutine CollectIndexData which operates in a manner consistent with the following pseudocode:

```
Load the configuration XML and verify that necessary nodes are present
for unused indexes and missing indexes
For every database, schema, parent object and index configured in
unused configuration do the following:
    Get index usage row from RDBMS engine (refer to IndexUsage
    table above for list of metrics to be captured) and do the following:
        If the row is new to the IndexUsage table then insert it;
        If the index usage data exists already for an index then
        update that row with the new data.
    Perform data purging on IndexUsage based on the data retention
    days configured in the XML.
For every database, schema, parent object and Index configured in
missing indexes configuration do the following:
    Get the missing index data row from RDBMS engine (refer to
    MissingIndex table above for list of metrics to be captured) and do
    the following:
        If the row is new to the MissingIndex table then insert it,
        that is, there is a new missing index recommendation;
        If the row exists already then update (make sure all the
        metrics are summarized in case the RDBMS exposes only
        the delta data).
```

| |
|---|
| Perform data purging on MissingIndex based on the data retention days configured in the XML. |

To schedule index data collection, some embodiments use a scheduling tool such as a Microsoft SQL Server® Agent job to schedule the subroutine CollectIndexData. The data are collected and accumulated at a regular interval, and can be used later for analysis.

Turning now to the Analyse Index Data module 204 used in some embodiments, this module of the DIM component 220 is responsible for analyzing the collected index related data from the IndexUsage and MissingData tables against the configuration provided by the database administrator in the metadata XML, to arrive at a set of index management activities to be performed, namely, actions 214 ultimately specified in the form of an implementation XML 420.

Functionalities of this module 204 include the following. Read the metadata configuration to identify the databases and objects to be analyzed with their threshold data to support the analysis, using, e.g., configuration XML DynamicIndexManagementMetadata.xml. Analyze the index data using the metadata and publish the results, using, e.g., subroutine AnalyseIndexes, and analysis results XML with format:
DIM_Analysis_<year>_<month>_<date>_<hour>_<min>_
  <sec>_<millisec>.xml
Then schedule the index data analysis.

To further illustrate some embodiments, the following analysis XML 412 is provided.

```
<DynamicIndexManagementAnalysis>
  <IndexDefragmentation DatabaseName="dbGCSCSAT" SchemaName="dbo"
    ParentObjectName="tblFactSurveyCompleted"
    IndexName="ixFactSurveyCompletedReceivedFromSurveyVendorDate_id"
    MaxAvgFragment="59%" Action="REBUILD" IsOnline="0" Enabled="1" />
  <IndexDefragmentation DatabaseName="dbGCSCSAT" SchemaName="dbo"
    ParentObjectName="tblFactSurveyCompleted"
    IndexName="ixFactSurveyCompletedSentToSurveyDate_id"
    MaxAvgFragment="88%" Action="REBUILD" IsOnline="0" Enabled="1" />
  <IndexDefragmentation DatabaseName="dbGCSCSAT" SchemaName="dbo"
    ParentObjectName="tblFactSurveyCompleted"
    IndexName="ixFactSurveyCompletedSurveyVersion_id"
    MaxAvgFragment="69%" Action="REBUILD" IsOnline="0" Enabled="1" />
  <IndexDefragmentation DatabaseName="dbGCSCSAT" SchemaName="dbo"
    ParentObjectName="tblFactSurveyCompleted"
    IndexName="XIF13dboFact_SurveyCompleted" MaxAvgFragment="98%"
    Action="REBUILD" IsOnline="1" Enabled="1" />
  <IndexDefragmentation DatabaseName="dbGCSCSATStaging"
    SchemaName="dbo" ParentObjectName="tblCandidateIncidentBaseView"
    IndexName="IXtblCandidateIncidentBaseView" MaxAvgFragment="100%"
    Action="REBUILD" IsOnline="0" Enabled="1" />
  <UnusedIndexes DatabaseName="dbGCSCSAT" SchemaName="dbo"
    ParentObjectName="tblFactSurveyCompleted"
    IndexName="ixFactSurveyCompletedReceivedFromSurveyVendorDate_id"
    IsConstraint="0" DaysUnused="9999999" Enabled="0" />
  <UnusedIndexes DatabaseName="dbGCSCSAT" SchemaName="dbo"
    ParentObjectName="tblFactSurveyCompleted"
    IndexName="ixFactSurveyCompletedSurveyVersion_id" IsConstraint="0"
    DaysUnused="9999999" Enabled="1" />
  <UnusedIndexes DatabaseName="dbGCSCSAT" SchemaName="dbo"
    ParentObjectName="tblFactSurveyCompleted"
    IndexName="XIF13dboFact_SurveyCompleted" IsConstraint="0"
    DaysUnused="9999999" Enabled="0" />
  <UnusedIndexes DatabaseName="dbGCSCSAT" SchemaName="dbo"
    ParentObjectName="tblFactSurveyCompleted"
    IndexName="ixFactSurveyCompletedSentToSurveyDate_id"
    IsConstraint="0" DaysUnused="9999999" Enabled="1" />
  <UnusedIndexes DatabaseName="dbGCSCSAT" SchemaName="dbo"
    ParentObjectName="tblFactSurveyCompleted"
    IndexName="ixFactSurveyCompletedCandidateInclusionGroup_id"
    IsConstraint="0" DaysUnused="9999999" Enabled="0" />
  <UnusedIndexes DatabaseName="dbGCSCSAT" SchemaName="dbo"
    ParentObjectName="tblFactSurveyCompleted"
    IndexName="ixFactSurveyCompletedCandidateSentToVendor"
    IsConstraint="0" DaysUnused="9999999" Enabled="0" />
  <UnusedIndexes DatabaseName="dbGCSCSATStaging" SchemaName="dbo"
    ParentObjectName="tblCandidateIncidentBaseView"
    IndexName="IXtblCandidateIncidentBaseView" IsConstraint="0"
    DaysUnused="9999999" Enabled="0" />
  <MissingIndexes DatabaseName="dbGCSCSATStaging" SchemaName="dbo"
    ParentObjectName="tblCandidateIncidentPropertiesView"
    SuggestedIndexName="tblCandidateIncidentPropertiesView_Incident_id_
    IncidentLineItem_id" EqualityColumns="[Incident_id], [IncidentLineItem_id]"
    SuggestedIndexType="NonClustered" Enabled="1" />
  <DisableActivityCommands ActivityCmmandIds="1,2,4" />
  <RerunActivityCommands ActivityCmmandIds="6,9" />
</DynamicIndexManagementAnalysis>
```

As to subroutine AnalyseIndexes, this subroutine reads the index usage data stored from IndexUsage, MissingIndex tables, and the index fragmentation data from the RDBMS engine, analyzes 410 them using the metadata configured using DynamicIndexManagementMetadata.xml, and publishes the results to a user with recommended (a.k.a. proposed) actions 214 to be performed, in the form of an analysis XML in an analysis folder.

Some systems do not collect and store the index fragmentation data in separate tables, as only the current snapshot of fragmentation level is used for analysis rather than fragmentation level over a period of time. But fragmentation level over time may be useful for analyzing index usage identifying missing indexes, as the RDBMS may purge these data or may expose only the delta data every time, depending the vendor implementation. For example, Microsoft SQL Server® systems purge the index usage data when restarted. Some embodiments utilize a subroutine AnalyseIndexes which operates in a manner consistent with the following pseudocode:

Read the configurations/thresholds from the metadata XML

For every <IndexDefragmentation/> tag in metadata XML do the following:

```
Get the database , schema , parent object , index name from
<IndexDefragmentation/> tag;
Get the threshold values and the corresponding actions from
<Defrag/> tags;
    Get the fragmentation level for the index with the given analysis
    mode (E.g., Microsoft SQL Server ® systems support sampling,
    normal, and detailed modes);
    Compare the fragmentation stats against the threshold values from
    <Defrag/> tags and assign the actions to be performed;
    Store the analysis results into a temporary location (e.g., a
    temporary table ##IndexFragments).
For every <UnusedIndexes/> tag in metadata XML do the following:
    Get the database, schema, parent object, and threshold values
    such as max allowed unused days;
    Get the index usage data from IndexUsage table;
    Compare the index usage stats against the threshold values;
    Store the eligible unused indexes into a temporary location (e.g., a
    temporary table ##UnusedIndex).
For every <MissingIndexes/> tag in metadata XML do the following:
    Get the database, schema, parent object, and threshold values
    such as number of missing indexes to report;
    Get the missing indexes data from MissingIndex DIM table;
    Compare the missing indexes stats against the threshold values;
    Store the eligible missing indexes candidates into a temporary
    location (e.g., a temporary table ##MissingIndexes).
Read the temporary location for all the analysis results and produce the
analysis results XML in the analysis XML 412 format shown above. One
noteworthy attribute in the results XML is "Enabled" which decides
whether the particular action needs to be implemented or not. This is
Enabled (=1) if the user has configured Automatic action in the metadata
XML file and disabled (=0) otherwise; the user can manually go through
the results later and enable it (=1) later.
```

As to the analysis results XML, the format can be, for example:
DIM_Analysis_<year>_<month>_<date>_<hour>_<min>_<sec>_<millisec>.xml In some embodiments, an analysis results XML published by the subroutine AnalyseIndexes conforms generally with the analysis XML 412 shown above.

Some embodiments schedule index data analysis using a scheduler tool of a relational database management system to call the subroutine AnalyseIndexes, so that the analysis is run in a regular interval and results are produced for consumption.

As to Verifying Analysis Results, with some embodiments a user goes through the analysis results produced by the AnalyseIndexes subroutine. Each action in the analysis results XML has an attribute called Enabled; when the user finds some action to be enabled/disabled this attribute can be used for that purpose.

As to Implementing Index Changes, in some embodiments the analysis and implementation modules are disconnected from each other. To run, the implementation module uses the analysis results XML complying to the schema definition expected by the implementation module; the analysis results XML may or may not be prepared using the analysis module. For example, a database administrator could prepare the implementation XML with desired actions, to be consumed by the implementation module to implement the changes physically. Unless expressly indicated as being manually created, however, all XML discussed herein are created partially or fully automatically, that is, as computational transformations of data rather than as mental activities.

Once the XML from Index Analyser is verified and the Enabled flags are set as expected, the implementation XML is placed into the analysis location where the DIM component implementing 312 changes will look for this XML 420. The primary responsibility of the implementation module 206 is to physically implement the index 122 changes on the system.

Functionalities of this module 206 include the following. Load the analysis results into DIM commands table, using, e.g., subroutine LoadAnalysisResults and relational table DynamicIndexManagementCommand. Allocate the loaded commands to available threads 218 for parallel execution, using, e.g., subroutine AllocateThreadActivity. Execute the commands using the scheduled threads, using, e.g., subroutine ImplementAnalysisResults. Schedule the implementation.

As to relational table DynamicIndexManagementCommand, in some embodiments this table is used to store the SQL commands to be executed to implement the index changes, and their process metadata such as associated thread, start execution time, end execution time and message, etc. This table is initially populated by the subroutine LoadAnalysisResults with no associated thread. Later the subroutine AllocateThreadActivity runs and allocates each command to a thread so that there is no locking among the commands while they run in parallel. Some embodiments use the following table schema for DynamicIndexManagementCommand:

| Column Name | Datatype | Length | Nullable | Description |
| --- | --- | --- | --- | --- |
| activity_command_id | int | 4 | no | Primary key |
| activity_id | int | 4 | no | Activity id from the XML |
| database_name | sysname | 256 | no | |
| schema_name | sysname | 256 | no | |
| parent_object_name | sysname | 256 | no | |
| index_name | sysname | 256 | no | |
| activity_command | nvarchar | −1 | no | SQL Command |
| thread_id | tinyint | 1 | yes | Thread to execute the command |
| execution_start_time | datetime | 8 | yes | Start time of the command |
| execution_end_time | datetime | 8 | yes | End time of the command |
| activity_status_message | nvarchar | −1 | yes | Status message (Succeeded, Failed, In Progress) |
| insert_time | datetime | 8 | no | Audit column |

As to subroutine LoadAnalysisResults, in some embodiments this procedure transforms the information provided in the analysis results XML 412 into SQL statements that can be understood by the target RDBMS, and loads them into the DIM commands table. In some embodiments, LoadAnalysisResults operates in a manner consistent with the following pseudocode:

```
Get the list of analysis results XML files to be processed;
For every file identified do the following:
    Load the XML into memory and make sure the root element is
    correct "<DynamicIndexManagementAnalysis />";
    Construct the Index defrag commands from the information given in
    <IndexDefragmentation/> tags and insert them to
    [DynamicIndexManagementCommand]. Below are some key things
    to be considered in this operation:
        Only commands with Enabled=1 are inserted;
        Command is also constructed to verify that the index exists
        before defragmenting them;
        Other incorrect configurations are ignored (e.g., for
        Microsoft SQL Server ® installations, ONLINE option is
        ignored when the action is REORGANIZE).
    Construct the Drop Index commands from the information given in
    <UnusedIndexes/> tags and insert them to
    [DynamicIndexManagementCommand]. Below are some key
    things to be considered in this operation:
        Only commands with Enabled=1 are inserted;
        Command is also constructed to verify that the index exists
        before dropping them;
        Do not drop the index also has a constraint.
    Construct the Create Index commands from the information given in
    <MissingIndexes/> tags and insert them to
    [DynamicIndexManagementCommand]. Below are some key
    things to be considered in this operation:
        Only commands with Enabled=1 are inserted;
        Command is also constructed to verify that the index
        doesn't exist before creating;
        SuggestedIndexName is the index name;
        Other incorrect configurations are ignored (e.g., for
        Microsoft SQL Server ® installations, included columns list
        is ignored for clustered indexes if given).
    Archive the file.
Check for duplicate commands in tblDynamicIndexManagementCommand
table; If there are any update their start and end execution time with
"9999-12-31" (A infinite date) and the status message as "Duplicate
of duplicate id". Except for the first command, all others are marked as
duplicate in this case.
```

As to subroutine AllocateThreadActivity, in some embodiments once the commands are loaded into a Command table then the commands will be associated with the available threads that can execute them based on the allocation. In some embodiments, max_thread_count is a parameter to this subroutine, which decides the number of tasks to execute these commands in parallel.

As to Thread Scheduling, in some embodiments instead of a dynamic scheduling and execution of the commands with these tasks, the approach chosen is to pre-assign the commands to the available thread queues and each command is executed by its corresponding task during the system execution. One part of such scheduling is to make sure that no two commands on the same parent object are executed in parallel, to avoid blocking.

In some embodiments, the following scheduling process is used. Create a thread queue table with each row representing a thread and two columns representing the thread id and the number of commands allocated to it, such as:

| @Thread_queue table | |
|---|---|
| Thread Id | int |
| Commands_allocated | int |

Populate the thread queue table, using, e.g., the following Microsoft SQL Server® script or similar code:

```
Set @id = 1
    While (@id <= @max_thread_count)  Begin
    Insert        @thread_queue(thread_id,commands_allocated)
    Select        @id,0
        Set @id = @id + 1   End
```

Create another table which will hold the unassigned (commands to be executed in the next run) commands for scheduling, using, e.g., the following or similar code:

```
Declare @unassigned_activity_commands Table(id int
    ,database_name      sysname
    ,[schema_name]      sysname
    ,parent_object_name sysname,commands_count int)
```

Commands are grouped under <DB.Schema.Object> and assigned to threads to make sure all the commands on a single parent object will be carried out by a single thread. Group commands count is sorted descending and distributed to threads so as to optimize the scheduling, using, e.g., the following or similar code:

```
Insert @unassigned_activity_commands
    (id,database_name,[schema_name],parent_object_name,commands_
count)
        Select Row_Number( )
            Over (Order By Count(dimc.activity_command_id)
        Desc) As Id
        , dimc.database_name
        , dimc.[schema_name]
        , dimc.parent_object_name
        , count(dimc.activity_command_id)
From [DynamicIndexManagementCommand] dimc With (Nolock)
Where dimc.execution_start_time Is Null
Group By dimc.database_name , dimc.[schema_name] ,
    dimc.parent_object_name
```

For every group of DB.Schema.ParentObject do the following. Get the thread which has lowest number of commands assigned to it; if there are many consider the first one. Assign the thread id to the commands that belong to the current Db.Schema.ParentObject. Update the thread queue with the new commands allocated to the thread.

As to subroutine ImplementAnalysisResults, in some embodiments this subroutine receives the thread_id as a parameter through which it will identify the commands to be executed by this context from table [DynamicIndexManagementCommand]. In some embodiments, ImplementAnalysisResults operates in a manner consistent with the following pseudocode:

```
For every command that is associated to this thread id do the following:
    Get the activity command from
```

```
DynamicIndexManagementCommand;
Set the execution start time as current date & time for this
activity command id;
Execute the command against the server;
Set the execution end time to current date and time.
```

As to scheduling the implementation, some embodiments use a scheduler tool to call the subroutine ImplementAnalysisResults multiple times with all the thread Ids so that the index changes are physically implemented in a regular interval automatically. Another subroutine may be created to make calls to ImplementAnalysisResults with different thread id, and the new subroutine may be scheduled accordingly.

CONCLUSION

Although particular embodiments are expressly illustrated and described herein as methods, as configured media, or as systems, it will be appreciated that discussion of one type of embodiment also generally extends to other embodiment types. For instance, the descriptions of methods in connection with FIGS. 3 and 4 also help describe configured media, and help describe the operation of systems and manufactures like those discussed in connection with other Figures. It does not follow that limitations from one embodiment are necessarily read into another. In particular, methods are not necessarily limited to the data structures and arrangements presented while discussing systems or manufactures such as configured memories.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific features of an example may be omitted, renamed, grouped differently, repeated, instantiated in hardware and/or software differently, or be a mix of features appearing in two or more of the examples. Functionality shown at one location may also be provided at a different location in some embodiments.

Reference has been made to the figures throughout by reference numerals. Any apparent inconsistencies in the phrasing associated with a given reference numeral, in the figures or in the text, should be understood as simply broadening the scope of what is referenced by that numeral.

As used herein, terms such as "a" and "the" are inclusive of one or more of the indicated item or step. In particular, in the claims a reference to an item generally means at least one such item is present and a reference to a step means at least one instance of the step is performed.

Headings are for convenience only; information on a given topic may be found outside the section whose heading indicates that topic.

All claims as filed are part of the specification.

While exemplary embodiments have been shown in the drawings and described above, it will be apparent to those of ordinary skill in the art that numerous modifications can be made without departing from the principles and concepts set forth in the claims. Although the subject matter is described in language specific to structural features and/or methodological acts, it is to be understood that the subject matter defined in the appended claims is not necessarily limited to the specific features or acts described above the claims. It is not necessary for every means or aspect identified in a given definition or example to be present or to be utilized in every embodiment. Rather, the specific features and acts described are disclosed as examples for consideration when implementing the claims.

All changes which come within the meaning and range of equivalency of the claims are to be embraced within their scope to the full extent permitted by law.

What is claimed is:

1. A method for dynamically managing database indexes, the method comprising the steps of:
   identifying a relational database index management action to a user;
   obtaining from a computing system memory at least one threshold for each of at least four relational database index management metrics, the threshold and the metric associated with the identified index management action, the metrics being among the following possible metrics, not all of which need be present:
      amount of time a lock was held on objects without a specified missing index,
      amount of CPU used without a specified missing index,
      amount of memory used without a specified missing index,
      number of reads per disk sector without a specified missing index,
      size of disk queue length without a specified missing index,
      number of query timeouts without a specified missing index;
      elapsed time since a specified index was last used;
   a computing system automatically collecting at least one value for the metric within a relational database management system;
   the computing system automatically determining that the collected value satisfies the threshold; and then
   a computing system automatically implementing the identified index management action without requiring an explicit further user authorization.

2. The method of claim 1, wherein the identifying step identifies at least one of the following relational database index management actions: reorganize a fragmented index, rebuild a fragmented index, add a missing index, remove an unused index.

3. The method of claim 1, wherein the receiving step receives a user-defined threshold for each of at least three of the following relational database index management metrics:
   average total user cost of executing a query,
   average user impact of executing a query,
   amount of time a lock was held on objects,
   amount of CPU used,
   amount of memory used,
   number of reads per disk sector,
   size of disk queue length,
   number of query timeouts,
   index fragmentation,
   number of days since an index was last used.

4. The method of claim 1, wherein the identified index management action includes an action to add a missing index, and wherein the receiving step receives a user-defined threshold for each of at least four of the following relational database index management metrics:
   average total user cost of executing a query without a specified missing index,
   average user impact of executing a query without a specified missing index,
   number of times a specified missing index could have helped in scans, number of times a specified missing index could have helped in seeks,
amount of time a lock was held on objects without a specified missing index,
amount of CPU used without a specified missing index,
amount of memory used without a specified missing index,
number of reads per disk sector without a specified missing index,
size of disk queue length without a specified missing index,
number of query timeouts without a specified missing index.

5. The method of claim 4, wherein the receiving step receives a respective user-defined threshold for each of at least seven of the relational database index management metrics.

6. The method of claim 1,
wherein the identified index management action includes an action to perform at least one of the following:
reorganize an index,
rebuild an index;
and
wherein the receiving step receives a user-defined threshold for at least one of the following relational database index management metrics:
amount of CPU used,
amount of memory used,
number of reads per disk sector,
size of disk queue length.

7. The method of claim 1, wherein the implementing step automatically implements the identified index management action while the relational database remains available for use by non-administrative users.

8. The method of claim 1, wherein the implementing step automatically implements the identified index management action in parallel on multiple tables of the relational database.

9. The method of claim 1, wherein the implementing step automatically implements the identified index management action with threads working in parallel on multiple tables of the relational database, with at most one thread working on any given table at any given time to implement the identified index management action.

10. The method of claim 1, wherein the method identifies a first action, receives a first threshold for a first metric, collects a first value for the first metric, automatically implements the first action, and further comprises the steps of:
identifying a second relational database index management action to the user;
obtaining from a computing system memory a second threshold for a second relational database index management metric, the second threshold and the second metric associated with the second identified index management action;
the computing system automatically collecting a second value for the second metric within the relational database management system;
the computing system automatically determining that the collected second value satisfies the second threshold; and then
a computing system automatically seeking an explicit user authorization to implement the second identified index management action.

11. A computer-readable medium configured with data and instructions for performing a method for dynamically managing database indexes, the method comprising the steps of:
identifying a relational database index management action to a user;
obtaining from a computing system memory at least one threshold for each of at least five relational database index management metrics, the threshold and the metric associated with the identified index management action, the metrics being among the following possible metrics, not all of which need be present:
average total user cost of executing a query without a specified missing index,
average user impact of executing a query without a specified missing index,
number of times a specified missing index could have helped in scans,
number of times a specified missing index could have helped in seeks,
amount of time a lock was held on objects without a specified missing index,
amount of CPU used without a specified missing index,
amount of memory used without a specified missing index,
number of reads per disk sector without a specified missing index,
size of disk queue length without a specified missing index,
number of query timeouts without a specified missing index;
elapsed time since a specified index was last used;
a computing system automatically collecting at least one respective value for each of the metrics within a relational database management system;
the computing system automatically determining that the collected values each satisfy the respective threshold; and then
the computing system automatically seeking an explicit user authorization to implement the identified index management action.

12. The configured medium of claim 11, wherein the method further comprises obtaining an explicit user authorization in response to the seeking step; and then implementing the identified index management action.

13. The configured medium of claim 12, wherein the implementing step implements the identified index management action with threads working in parallel on the relational database, with at most one thread working on any given table or database view at any given time to implement the identified index management action.

14. The configured medium of claim 11, wherein the method identifies a first action, receives first thresholds for a first set of metrics, collects first values for the first set of metrics, seeks user authorization to implement the first action, and further comprises the steps of:
identifying a second relational database index management action to the user;
obtaining from a computing system memory a second set of thresholds for a second set of relational database index management metrics, the second set of thresholds and the second set of metrics associated with the second identified index management action, the second set of metrics being among the possible metrics but not necessarily containing the same metrics as the first set of metrics;
a computing system automatically collecting a second set of values for the second set of metrics within the relational database management system;
the computing system automatically determining that the collected second of values satisfies the second set of thresholds; and then the computing system automatically implementing the identified index management action, while the relational database remains available for use by non-administrative users, and without requiring further explicit user authorization.

15. A computer system comprising:
a logical processor;
a memory in operable communication with the logical processor;
a relational database configuring the memory; and
a relational database management system configuring the memory and including at least:
  an index metrics collection module configured to automatically collect relational database index management metric values based at least in part on queries to the relational database by non-administrative users and to configure the memory with at least six of the following possible metrics, not all of which need be present:
    average total user cost of executing a query without a specified missing index,
    average user impact of executing a query without a specified missing index,
    number of times a specified missing index could have helped in scans,
    number of times a specified missing index could have helped in seeks,
    amount of time a lock was held on objects without a specified missing index,
    amount of CPU used without a specified missing index,
    amount of memory used without a specified missing index,
    number of reads per disk sector without a specified missing index,
    size of disk queue length without a specified missing index,
    number of query timeouts without a specified missing index;
  an index metrics analysis module configured to automatically determine whether collected relational database index management metric values satisfy specified thresholds; and
  an index management action implementation module configured to implement index management actions, while the relational database remains available to non-administrative users, in response to a determination by the index metrics analysis module that metric values satisfy specified thresholds.

16. The system of claim 15, wherein the index metrics collection module is configured to automatically collect and configure the memory with at least seven of the following possible metrics, not all of which need be present:
  average total user cost of executing a query without a specified missing index,
  average user impact of executing a query without a specified missing index,
  number of times a specified missing index could have helped in scans,
  number of times a specified missing index could have helped in seeks,
  amount of time a lock was held on objects without a specified missing index,
  amount of CPU used without a specified missing index,
  amount of memory used without a specified missing index,
  number of reads per disk sector without a specified missing index,
  size of disk queue length without a specified missing index,
  number of query timeouts without a specified missing index.

17. The system of claim 16, wherein the index metrics collection module is configured to automatically collect and configure the memory with at least eight of the possible metrics, based on queries to the relational database by only non-administrative users.

18. The system of claim 15, wherein the index management action implementation module is configured to automatically implement multiple index management actions, while the relational database remains available to non-administrative users, and without requiring an explicit further user authorization.

19. The system of claim 15, wherein the index management action implementation module is configured to seek user authorization to implement at least one index management action after a determination by the index metrics analysis module that metric values satisfy specified thresholds associated with that action by a user.

20. The system of claim 15, further comprising index management action implementation threads to implement multiple index management actions, with the threads working in parallel on multiple tables of the relational database, and with at most one thread working on any given table at any given time.

* * * * *